US008767608B2

(12) United States Patent
Josiam et al.

(10) Patent No.: US 8,767,608 B2
(45) Date of Patent: Jul. 1, 2014

(54) METHOD AND APPARATUS TO ENABLE SWITCHING BETWEEN TWO CARRIERS IN A CELLULAR COMMUNICATION NETWORK

(75) Inventors: Kaushik Josiam, Dallas, TX (US); Tae Young Kim, Seongnam-si (KR); Ying Li, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 13/191,155

(22) Filed: Jul. 26, 2011

(65) Prior Publication Data
US 2012/0020271 A1   Jan. 26, 2012

Related U.S. Application Data

(60) Provisional application No. 61/372,402, filed on Aug. 10, 2010, provisional application No. 61/410,287, filed on Nov. 4, 2010.

(51) Int. Cl.
*H04H 20/71* (2008.01)
(52) U.S. Cl.
USPC .......................................................... 370/312
(58) Field of Classification Search
USPC ......... 370/208, 312, 328, 329, 330, 331, 343, 370/480, 485, 486
See application file for complete search history.

(56) References Cited

U.S. PATENT DOCUMENTS

| 2003/0088695 | A1 | 5/2003 | Kwak et al. |
| 2006/0221894 | A1 | 10/2006 | Casaccia et al. |
| 2008/0316969 | A1 | 12/2008 | Prakash et al. |
| 2010/0216454 | A1* | 8/2010 | Ishida et al. ................... 455/424 |
| 2011/0013554 | A1* | 1/2011 | Koskinen ........................ 370/315 |
| 2011/0268056 | A1* | 11/2011 | Soong et al. ................... 370/329 |
| 2012/0207073 | A1* | 8/2012 | Kim et al. ....................... 370/311 |
| 2012/0287837 | A1* | 11/2012 | Kim et al. ....................... 370/312 |
| 2012/0294222 | A1* | 11/2012 | Kim et al. ....................... 370/312 |

FOREIGN PATENT DOCUMENTS

WO   WO 2010/059003 A2   5/2010

OTHER PUBLICATIONS

International Search Report dated Mar. 21, 2012 in connection with International Application No. PCT/KR2011/005847.
Written Opinion of International Searching Authority dated Mar. 21, 2012 in connection with International Application No. PCT/KR2011/005847.

* cited by examiner

*Primary Examiner* — Anh-Vu Ly
*Assistant Examiner* — Abdullahi Ahmed

(57) ABSTRACT

For use in a wireless communication network, a subscriber station is capable of switching carriers. The subscriber station is configured to receive an N-bit bitmap from the communication network and determine at least one unicast available interval based on an arrangement of the N bits in the N-bit bitmap. The subscriber station is also configured to switch from a first carrier to a second carrier at a start of the at least one unicast available interval.

24 Claims, 9 Drawing Sheets

METHOD AND APPARATUS TO ENABLE SWITCHING BETWEEN TWO CARRIERS IN A CELLULAR COMMUNICATION NETWORK

CROSS-REFERENCE TO RELATED APPLICATION(S) AND CLAIM OF PRIORITY

The present application is related to U.S. Provisional Patent Application No. 61/372,402, filed Aug. 10, 2010, entitled "METHOD AND APPARATUS TO ENABLE SWITCHING BETWEEN TWO CARRIERS IN A CELLULAR COMMUNICATION NETWORK" and U.S. Provisional Patent Application No. 61/410,287, filed Nov. 4, 2010, entitled "METHOD AND APPARATUS TO ENABLE SWITCHING BETWEEN TWO CARRIERS IN A CELLULAR COMMUNICATION NETWORK". Provisional Patent Applications No. 61/372,402 and 61/410,287 are assigned to the assignee of the present application and is hereby incorporated by reference into the present application as if fully set forth herein. The present applications hereby claim priority under 35 U.S.C. §119(e) to U.S. Provisional Patent Application No. 61/372,402 and 61/410,287.

TECHNICAL FIELD OF THE INVENTION

The present application relates generally to multi-carrier wireless communication and, more specifically, to a method and apparatus to enable switching between two carriers in a cellular communication network.

BACKGROUND OF THE INVENTION

In a typical cellular communications system, a certain geographical area is divided into regions called cells. The mobile stations (MSs) in each cell are served by a single base station (BS). A BS transmits information to a particular MS (or a group of MSs) in its cell on the radio path referred to as the downlink (DL), while the MSs transmit information to the BS on the radio path referred to as the uplink (UL). The transmissions on the UL and the DL may be on the same time intervals but on different frequency bands (referred to as frequency division duplexing, or FDD), or on the same frequency band but during non-overlapping time intervals (referred to as time division duplexing, or TDD).

SUMMARY OF THE INVENTION

For use in a subscriber station in a wireless communication network, a method of switching carriers is provided. The method includes receiving a N-bit bitmap from the communication network. The method also includes determining at least one unicast available interval based on an arrangement of the N bits in the N-bit bitmap. The method further includes switching from a first carrier to a second carrier at a start of the at least one unicast available interval.

For use in a wireless communication network, a subscriber station capable of switching carriers is also provided. The subscriber station is configured to receive a N-bit bitmap from the communication network. The subscriber station is also configured to determine at least one unicast available interval based on an arrangement of the N bits in the N-bit bitmap. The subscriber station is further configured to switch from a first carrier to a second carrier at a start of the at least one unicast available interval.

For use in a wireless communication network having a plurality of base stations, a method of switching carriers for communication with a subscriber station is provided. The method includes transmitting a N-bit bitmap from a first base station to a subscriber station. The method also includes determining at least one unicast available interval based on an arrangement of the N bits in the N-bit bitmap. The method further includes, at a start of the at least one unicast available interval, transferring communication with the subscriber station from the first base station to a second base station, where the first base station is associated with a first carrier and the second base station is associated with a second carrier.

A wireless communication network having a plurality of base stations capable of communicating with a subscriber station is provided. The communication network includes a first base station configured to transmit a N-bit bitmap to a subscriber station. The first base station is also configured to determine at least one unicast available interval based on an arrangement of the N bits in the N-bit bitmap. The first base station is further configured to, at a start of the at least one unicast available interval, transfer communication with the subscriber station to a second base station. The first base station is associated with a first carrier and the second base station is associated with a second carrier.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
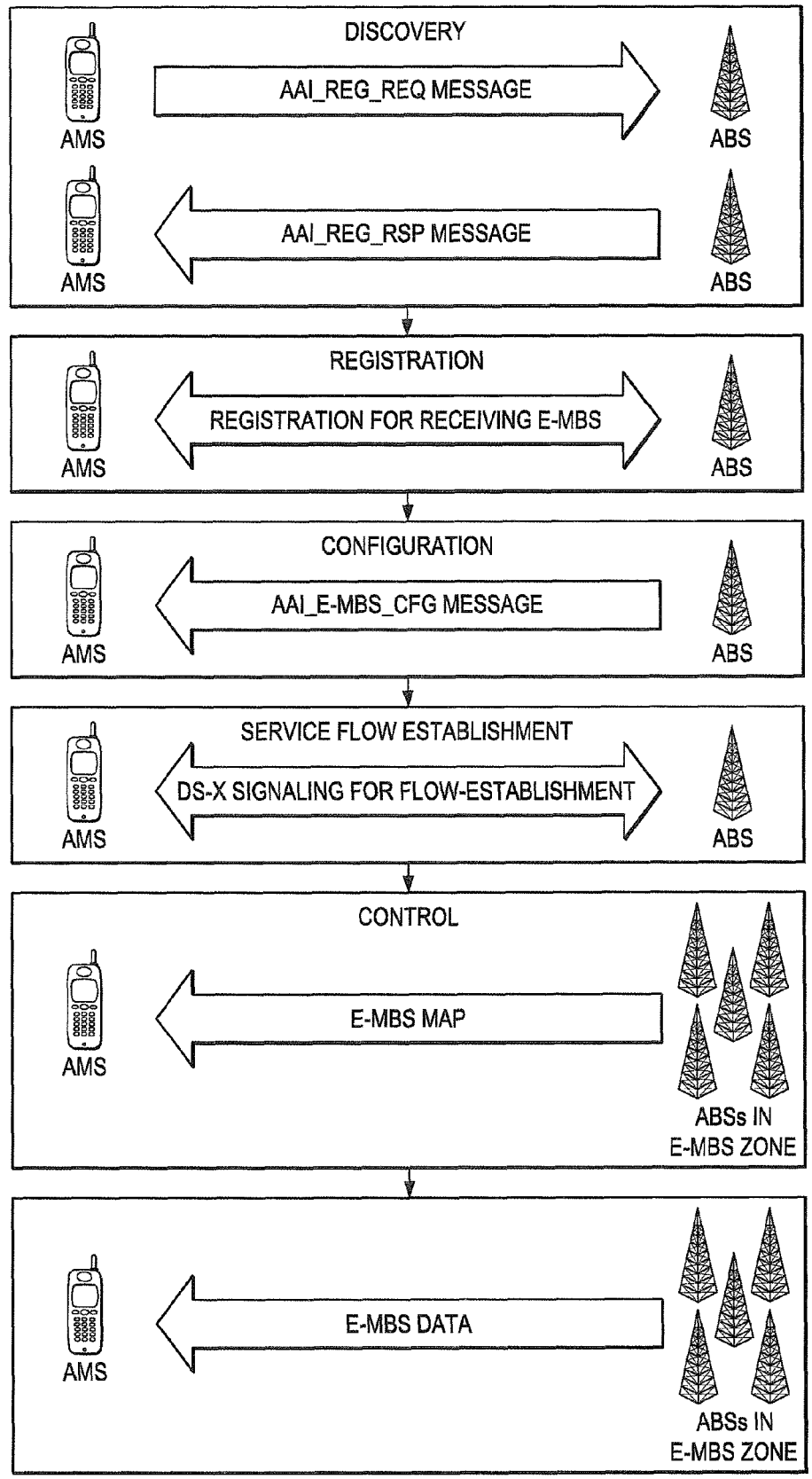
FIG. 1 illustrates a detailed flow of messages between an Advanced Mobile Station (AMS) and an Advanced Base Station (ABS) from the time the AMS registers to the time the AMS starts receiving E-MBS offerings.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged cellular communication network.

The following documents and standards descriptions are hereby incorporated into the present disclosure as if fully set forth herein:

IEEE P802.16m/D7, "DRAFT Amendment to IEEE Standard for Local and Metropolitan Area Networks; Part 16: Air Interface for Broadband Wireless Access systems; Advanced Air Interface," July 2010 (hereinafter "REFERENCE 1");

IEEE C802.16m-10/0761r1, Proposed text for carrier switching mode for E-MBS (16.9), July 2010 (hereinafter "REFERENCE 2");

IEEE C802.16m-10/0900, Carrier switching operation for E-MBS receiving, July 2010 (hereinafter "REFERENCE 3");

IEEE C802.16m-10/0792r1, Proposed text for E-MBS operation for carrier switching mode (16.2.3/16.9.2.2), July 2010 (hereinafter "REFERENCE 4"), Embodiments of the following disclosure are described with respect to a cellular communication system where the transmissions on the DL and UL are based on OFDM (Orthogonal Frequency Division Multiplexing) modulation. Such embodiments are for example purposes only. It will be understood that principles of this disclosure may be applicable in other suitable modulation schemes.

In OFDM modulation, the available bandwidth for the radio link (DL or UL) is divided into a large number of smaller-bandwidth units referred to as sub-carriers (SCs), onto which the information to be transmitted is embedded. Due to OFDM modulation, on the UL, if the MSs in communication with a BS simultaneously use non-overlapping SC sets to make transmissions to the BS, then when received at the BS, the transmission from any MS is rendered orthogonal to the transmission from any other MS. To clarify further, assume that MS i uses SC set $\{Si\}$ to make UL transmissions to the BS, and that the SC sets used by different MSs are non-overlapping. Then, when received at the BS, the transmissions from MS i on SC set $\{Si\}$ are not interfered with by any of the transmissions to the BS from any of the MSs j, j≠i.

Similarly, on the DL, if the BS uses non-overlapping SCs to make simultaneous transmissions to different MSs, then at any MS, the transmissions meant for other MSs appear orthogonal to the transmissions meant for it. To clarify further, assume that the BS makes transmissions to MS using SC set $\{Si\}$, and uses non-overlapping SC sets to make transmissions to various MSs. Then, when received at the MS i, the transmissions from the BS on SC set $\{Si\}$ are not interfered with by any of the transmissions from the BS to any of the MSs j, j≠i.

This property of OFDM modulation allows simultaneous communications between several MSs and the BS on the UL, and the BS and several MSs on the DL. When transmission from the BS (or MS) is intended for a single MS (or BS), then such transmissions are termed unicast or point-to-point transmissions. When transmissions occur from a single transmitter to multiple receivers, such transmissions are called broadcast transmissions. Examples of the broadcast transmission include the broadcast control channel (e.g., a super frame header (SFH)) and synchronization signals (e.g., advanced preambles). Data can also be broadcast as in the case of mobile broadcast TV. Certain transmissions are point to multipoint, yet are specialized transmissions designed for a specific set of receivers. Such transmissions are called multicast transmissions. Examples of multicast transmissions include subscriber based mobile TV where transmissions on the DL are decoded only by subscribing MSs.

Trends in the market for mobile broadband using cellular communication systems identify multimedia entertainment on wireless devices (e.g., smart phones, laptops) as one of the key drivers promoting the growth in higher data rates and improved user services. To support multimedia entertainment in next generation wireless systems, numerous wireless standards committees are promoting wireless standards that are optimized for the transmission of multimedia broadcast services. In the 3GPP standard, multimedia content: is carried on Multimedia Broadcast Multicast Service (MEMS). In the 3GPP2 standard, multimedia content is carried on Broadcast Multicast Service (BCMCS). In the IEEE 802.16 standard, multimedia content is carried on Multicast Broadcast Service (MBS). The IEEE 802.16m standard, currently under development, is an enhanced update to the existing IEEE 802.16e standard. Consequently, the enhancements to MBS in IEEE 802.16m are termed Enhanced-MBS (E-MBS). Hereafter, E-MBS may be used generically to refer to MBS, E-MBS, and/or BCMCS.

E-MBS is a downlink transmission from the base station (BS) to the mobile stations (MSs) subscribing to the service. The downlink of IEEE 802.16m uses the OFDM modulation scheme to transmit to the MS. In OFDM, the available bandwidth is split into subcarriers using simple IFFT/FFT operations. The subcarriers' bandwidths are the same. Subcarriers are used to carry either control signaling or data for MSs. An OFDM symbol is a collection of subcarriers that span the system bandwidth. Further, to make resource utilization efficient, OFDM symbols are grouped to form a sub-frame. In IEEE 802.16m, six (6) OFDM symbols are used to form a regular sub-frame that is 0.625 ms long. Eight (8) such regular sub-frames form a frame that is 5 ms long. Four (4) frames make a super-frame that spans 20 ms (see REFERENCE 1).

An E-MBS Scheduling Interval (MSI) refers to a number of successive frames for which the access network may schedule traffic for the streams associated with the MBS prior to the start of the interval. The length of this interval depends on the particular use case of MBS and is dictated by the minimum switching time requirement set in the IEEE 802.16m System Requirements Document (SRD). In other words, MSI refers to the transmission frequency of a particular MBS stream.

As used herein, a mobile station (MS) may also be referred to as an Advanced Mobile Station (AMS), a base station (BS) may also be referred to as an Advanced Base Station (ABS), and an Advanced Air Interface (AAI) may be referred to as an air interface of a communication system.

FIG. 1 illustrates a detailed flow of messages between an AMS and an ABS from the time the AMS registers to the time the AMS starts receiving E-MBS offerings. Service discovery occurs as part of the general capability exchange and registration that occurs during the AMS's network entry. The AMS sends an Advanced Air Interface-REGistration-REQuest (AAI-REG_REQ) message, which contains the identifiers to enable registration with the network. In response, the ABS transmits an AAI-REG-ReSPonse (AAI-REG-RSP) message that informs the AMS of the ABS's capabilities. In that message, a parameter called E-MBS capabilities indicates the transmission mode for E-MBS within the coverage area of the ABS. Following discovery, the AMS registers with the ABS to receive E-MBS services through upper layer signaling that are outside the scope of IEEE 802.16m standard. During registration, the AMS also may receive a service guide containing the E-MBS IDs and Flow IDs (FIDs) for the programs that are offered in the E-MBS zone. The AMS then learns the E-MBS Zone ID to which the ABS belongs by decoding the AAI-EMBS-ConFiGuration (AAI-EMBS-CFG) message.

Service flows are added for the various E-MBS streams using AAI-Dynamic Service.Addition-REQuest (AAI-DSA-REQ) messages. During operation, the service flows corresponding to the E-MBS content may be added, deleted, or changed using AAI-DSA (Add), AAI-DSD (Deletion) and AAI-DSC (Change) messages (which may be collectively referred to as "DS-X" messages). The ABS-initiated DS-X messaging is mandatory while AMS-initiated is not. Once service flows are established, an E-MBS control message called the E-MBS MAP is decoded. The E-MBS MAP carries the required decoding parameters for the different E-MBS bursts. Using the decoding parameters for the E-MBS flow whose service flows have been established, the AMS decodes the E-MBS content.

Multicarrier Operations

To increase data rates in a wireless communication system, a transmitter can increase the bandwidth, power, or both. Both bandwidth and power are under strict regulatory oversight. Hence, next generation wireless standards intelligently utilize the available spectrum (bandwidth) and maintain the transmit power over the available spectrum under a specified value. One way to overcome the regulatory limitations on power and bandwidth is by adding more transmit and/or receive antennas. The next generation wireless standards like IEEE 802.16m already specify using up to eight (8) antennas. With requirements of spectral efficiency expected to rise, service providers have to come up with innovative ways to augment spectral efficiency. A proposed method is to use multiple carriers. A given bandwidth is modulated on a carrier with a given center frequency. As an example, IEEE 802.16 based WiMAX service uses a 2.3-2.6 GHz time division duplexing (TDD) spectrum. The entire 2.3-2.6 GHz spectrum is split into multiple bands, each band having a bandwidth of 20 MHz (or less) and each piece is auctioned off to an operator. Therefore, an operator may have multiple 20 MHz spectrums or multiple 10 MHz spectrums that are not necessarily contiguous. As previously described, to augment spectral efficiency, multicarrier methods are provided so that users can receive data from an aggregated set of carriers that cumulatively add their bandwidth. To perform this operation efficiently, standards provide numerous enablers. The following paragraphs describe certain definitions that are from the IEEE 802.16m system.

The carriers involved in multicarrier operation from an MS's point of view are of two types: primary carrier and secondary carrier. A primary carrier is a standalone carrier where an AMS completes initial network entry or network reentry procedures. When supporting multicarrier operations, the AMS has one primary carrier and may be assigned multiple secondary carriers. Secondary carriers are additional carriers which may be configured for the AMS. The unicast medium access control (MAC) control messages related to multicarrier operations are sent to the AMS through its primary carrier.

In multicarrier operation, a common MAC protocol can utilize radio resources in the primary carrier and one or more of the secondary carriers, while maintaining full control of AMS mobility, state and context through the primary carrier.

For frequency division duplexing (FDD) systems, each available downlink or uplink frequency channel (and for TDD systems, each available duplexed frequency channel) is individually referred to as a carrier using a physical carrier index. A physical carrier index is the index assigned by the network for the available carriers and is sorted from the lower frequency to higher frequency.

Each physical carrier may be configured differently as follows:

Fully Configured Carrier: A standalone carrier for which all control channels (including synchronization, broadcast, multicast and unicast control signaling) are configured. A fully configured carrier is supported by each AMS regardless of the support of multicarrier.

Partially Configured Carrier: A carrier configured for a downlink only transmission. The partially configured carriers are used only in conjunction with a primary carrier and do not operate standalone to offer services for an AMS.

A primary carrier is fully configured, while a secondary carrier may be fully or partially configured depending on deployment scenarios. Whether a carrier is fully configured or partially configured is indicated using a PA-Preamble of the carrier. The AMS does not attempt to perform network entry or handover over the partially configured carriers.

A secondary carrier for an AMS, if fully configured, may serve as a primary carrier for other AMSs. The multiple AMS's with different primary carriers may also share the same physical carrier as their secondary carrier.

The following multicarrier operation modes will now be described:

Multicarrier Aggregation: A multicarrier mode in which the AMS maintains its physical layer connection and monitors the control signaling on the primary carrier while proceeding data transmission on the secondary carrier. The resource allocation to an AMS may span across a primary and multiple secondary carriers. Link adaptation feedback mechanisms may incorporate measurements relevant to both primary and secondary carriers. In multicarrier aggregation mode, the system may assign secondary carriers to an AMS in the downlink and/or uplink asymmetrically based on AMS capability, system load (i.e., for static/dynamic load balancing), peak data rate, or QoS demand. Multiple transceivers may be required at the AMS to support multicarrier aggregation mode, one transceiver for each carrier. When multiple transceivers are not available, a single transceiver with a wide band filter may be used to perform the operation.

Multicarrier Switching: A multicarrier mode in which the AMS switches its physical layer connection from the primary to the partially configured or fully configured secondary carrier by the ABS's instruction to receive E-MBS services on the secondary carriers. The AMS connects with the secondary carrier for the specified time period and then returns to the primary carrier. When the AMS is connected to the secondary carrier, the AMS is not required to maintain its transmission or reception through the primary carrier. A single transceiver is sufficient to support multicarrier switching at the AMS.

Basic multicarrier mode: The basic multicarrier mode in which the AMS operates with a single carrier but may support the primary carrier change procedure as well as optimized scanning of carriers involved multicarrier operation.

An AMS that supports at least one of the above multicarrier modes is called a multicarrier AMS. An AMS that does not support at least one of the above multicarrier modes is called a single-carrier AMS.

The following general scenario may be applicable for all multicarrier operations:

The system defines N standalone fully configured carriers, each configured with the synchronization, broadcast, multicast, and unicast control signaling channels needed to support a single-carrier AMS. Each AMS in the cell is connected to, and its state is controlled through, its primary carrier.

The system may also define M (M>=0) partially configured carriers, which an only be used as secondary carriers along with a primary carrier, for downlink only data transmissions.

The set of all supported carriers in an ABS is called "available carriers". The available carriers may be in different parts of the contiguous spectrum block or in non-contiguous spectrum blocks.

Subsets of available carriers are designated as assigned carriers, which are able to be activated for data transmission.

Subsets of assigned carriers are designated as active carriers, which are activated from assigned carriers and are used for data transmission between AMS and ABS.

In addition to the information about the primary carrier, an ABS can also provide AMS's with some configuration information about its available carriers through the primary carrier by AAI_Global-Config and AAI_MC-ADV messages.

The following embodiments of this disclosure describe multicarrier operations to enable E-MBS reception at the AMS. According to the IEEE 802.16m Amendment Draft Standard, E-MBS data can be transmitted via an alternative carrier (i.e., a carrier other than the AMS's primary carrier) (see REFERENCE 1). In cases where E-MBS is received on a secondary carrier, service flows are configured in the primary carrier and the AMS is redirected to the relevant carrier through a DSA mechanism. The AAI_E-MBS_CFG message, E-MBS MAP message, and E-MBS data are all relevant control channels for E-MBS service and are transmitted in the secondary carrier. In carrier switching mode, the AMS receiving the AAI_E-MBS_CFG message or E-MBS MAP message or data is unavailable on the primary carrier for any exchange with the primary carrier. An AMS with multiple transceivers may be able to receive E-MBS data while communicating with the ABS on the primary carrier.

In order to receive an AAI_E-MBS-CFG message, E-MBS MAP, and E-MBS data, an AMS with only one transceiver should switch its carrier to the relevant carrier. In the time that the AMS is not receiving an AAI_E-MBS-CFG message and E-MBS data to which the AMS is subscribed in the secondary carrier, the AMS either returns to the primary carrier or stays in the secondary carrier. During the time the AMS is in the secondary carrier, the ABS cannot schedule the AMS for any unicast transmission. It is noted that the AMS does not have to return to the primary carrier when there is no traffic to be transmitted via the primary carrier.

To avoid any interruption in E-MBS reception due to data exchange on the primary carrier, the following operations are proposed in REFERENCE 2, REFERENCE 3, and REFERENCE 4.

The AMS reports which channel it is receiving periodically or when the channel is changed using a new message to inform the ABS when the AMS available in the primary carrier and when the AMS will switch to the secondary carrier (see REFERENCE 3 and REFERENCE 4).

The AMS is informed in the DS-X message as to when the AMS should switch carriers to receive E-MBS using a parameter called unicast available interval in the AAI_DSA_REQ message as shown in Table 1 below (see REFERENCE 2). Generally, a group of default E-MBS contents are initiated at the same time with the AAI_DSA message to reduce the E-MBS contents switching delay within the default E-MBS contents, This is one reason why AAI_DS-X messages include group parameters. During the DSA transaction, the ABS allocates "Unicast Available Interval Start" and "Unicast Available Interval End" parameters to the AMS.

Figure 2:
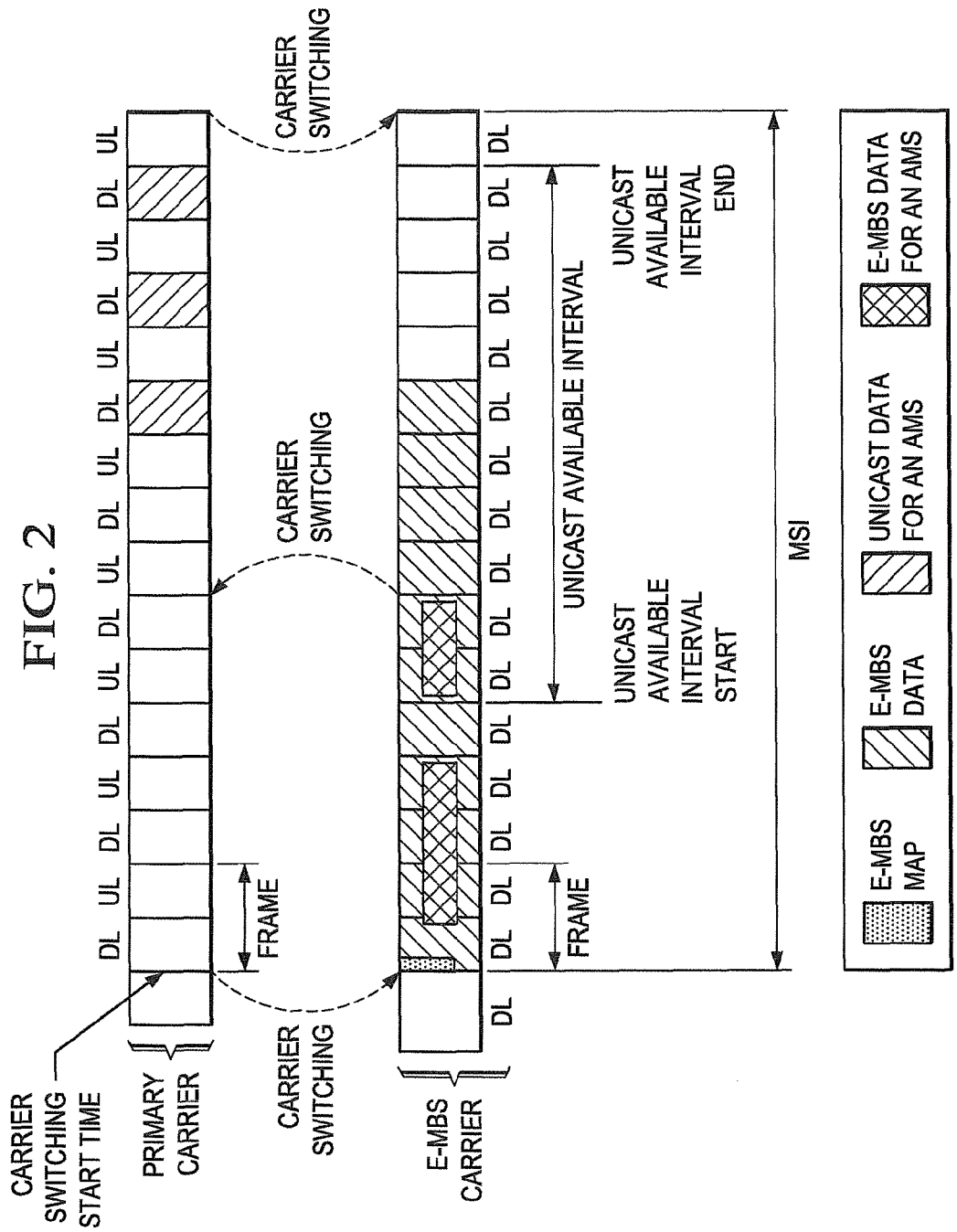
FIG. 2 illustrates carrier switching using an explicit unicast available interval indication.

FIG. 2 illustrates carrier switching using an explicit unicast available interval indication. As shown in FIG. 2, the AMS switches back and forth between the primary carrier and the E-MBS carrier using the parameters of Unicast Available Interval Start and Unicast Available Interval End. In other words, the AMS stays at the primary carrier from Unicast Available Interval Start to Unicast Available Interval End. The AMS can receive or transmit unicast data traffic when it stays on the primary carrier. At the end of the unicast available interval, the AMS may switch to the E-MBS carrier to receive E-MBS data bursts. Whenever the AMS adds or removes certain E-MBS content, the ABS re-allocates the unicast available interval.

In some proposals, the AMS reports frequently on the E-MBS streams that the AMS is receiving (see REFERENCE 3 and REFERENCE 4). When the AMS is operating in an idle state, the idle state AMS changes its state to a connected state to report the message to the ABS. The AAI_DSA message shown in Table 1 may be available to reduce the reporting overhead (see REFERENCE 2). However, additional signaling such as AAI_DS-X may not be avoidable due to variable allocation of the E-MBS burst in the E-MBS Scheduling Interval.

TABLE 1

Explicit Indication of Unicast Available Interval in the AAI_DSA Message

| M/O | Attributes/ Array of attributes | Size (bits) | Value/Notes |
| --- | --- | --- | --- |
| O | Carrier Switching Start Time | 4 | 4 LSBs of superframe number at which carrier switching happens |
| O | Number of Unicast Available Intervals | 2 | Number of Unicast Available Intervals within an MSI (default = 1) |

TABLE 1-continued

Explicit Indication of Unicast Available Interval in the AAI_DSA Message

| M/O | Attributes/ Array of attributes | Size (bits) | Value/Notes |
|---|---|---|---|
| O | Unicast Available Interval Start | Variable | In units of frames where N is Number of Unicast Available Intervals. The AMS stays at primary carrier from Unicast Available Interval Start to Unicast Available Interval End MSI length == 0b00: 3 * N bits MSI length == 0b01: 4 * N bits MSI length == 0b10: 5 * N bits MSI length == 0b11: 6 * N bits |
| O | Unicast Available Interval End | Variable | In units of frames where N is Number of Unicast Available Intervals. The AMS stays at primary carrier from Unicast Available Interval Start to Unicast Available Interval End MSI length == 0b00: 3 * N bits MSI length == 0b01: 4 * N bits MSI length == 0b10: 5 * N bits MSI length == 0b11: 6 * N bits |

In accordance with this disclosure, the unicast available interval may be defined using an arrangement of bits. Let $b_0$, $b_1, b_2, \ldots, b_N$ be a string of bits where $b_i$ can have a value of '0' or '1' and i indicates the position of the bit in the string. For ease of explanation, assume that when the $i^{th}$ bit $b_i$ has a value of '0', then the AMS is unavailable to the primary carrier for unicast scheduling and is in the E-MES carrier receiving an E-MBS transmission. Conversely, if the $i^{th}$ bit $b_i$ has a value of '1', then the AMS is available to the primary carrier for unicast scheduling.

Each bit $b_i$ corresponds to a time interval in the MBS scheduling interval (MSI). An MSI is split into N intervals with each interval represented by a bit. Carrier switching from the secondary E-MBS carrier to the primary carrier occurs at the end of interval i when $b_i b_{i+1}$='01' (i.e., when the bits in the string at the $i^{th}$ and $i+1^{th}$ position are '0' and '1' respectively). Similarly, the AMS switches from the primary carrier to the secondary E-MBS carrier at the end of interval i when $b_i b_{i+1}$='10' (i.e., when the bits in the string at the $i^{th}$ and $i+1^{th}$ position are '1' and '0' respectively). It is noted that using a value of '1' to indicate availability to unicast primary carrier is purely a matter of convention. Any two different numbers can be used to represent availability and unavailability to the primary unicast carrier.

Figure 3:
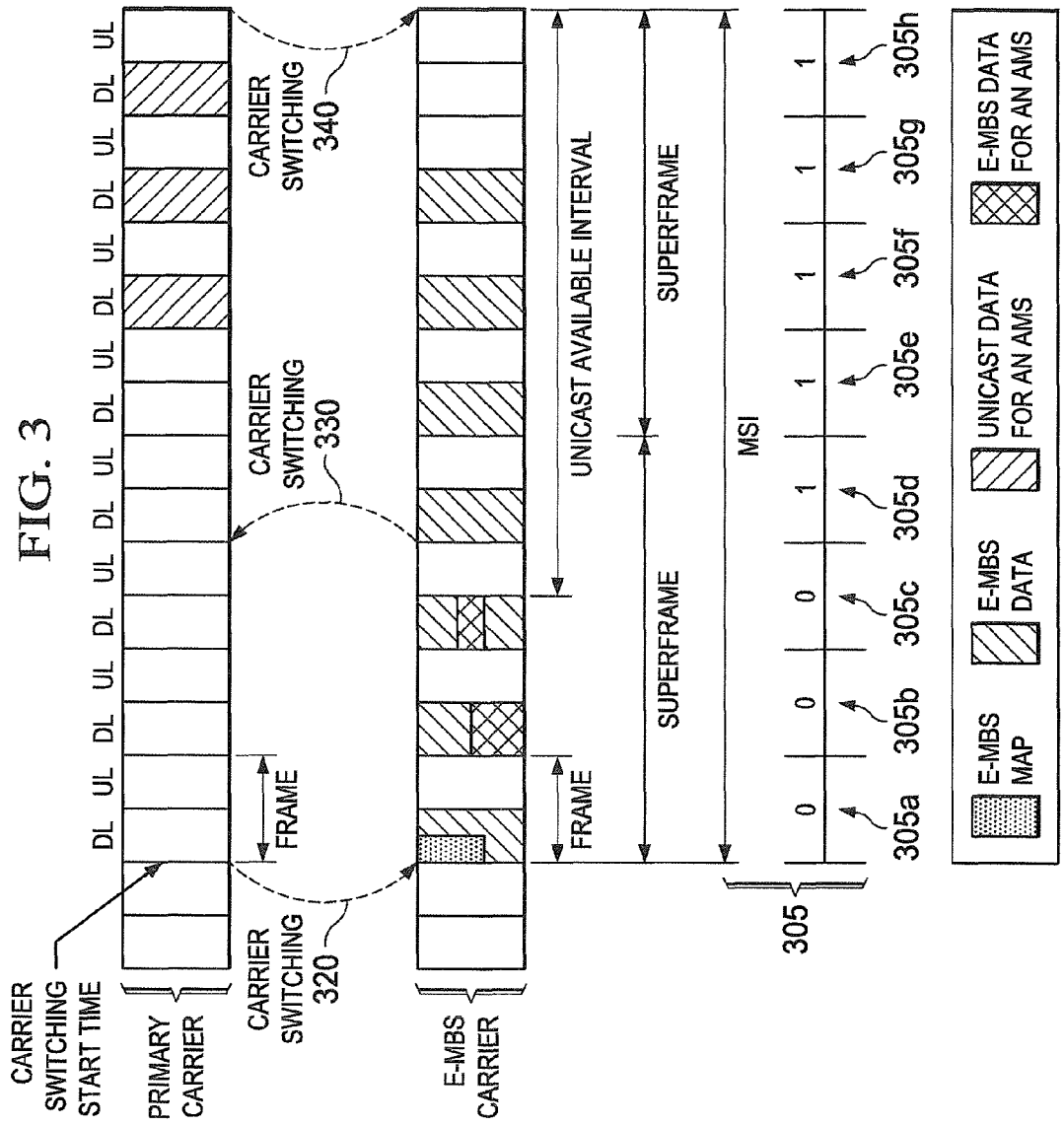
FIG. 3 illustrates use of a string or bitmap to indicate a unicast available interval, according to an embodiment of this disclosure.

FIG. 3 illustrates use of a string or bitmap to indicate a unicast available interval, according to an embodiment of this disclosure. As shown in FIG. 3, an MSI 305 having a length of two (2) superframes (40 ms length) is divided into N=8 intervals 305a-305h, each interval having a length of one (1) frame (5 ms). An eight-bit string or bitmap $b_0 b_1 b_2 b_3 \ldots b_7$ is defined for MSI 305, with each bit corresponding to one of the eight intervals 305a-305h. As explained above, a transition in the series of bits from '0' to '1' or from '1' to '0' corresponds to a transition between the primary and E-MBS carriers. Thus, bit string $b_0 b_1 b_2 b_3 \ldots b_7$='00011111' indicates that the AMS switches carriers twice during the MSI, once to the E-MBS carrier at the beginning of the MSI (indicated at 320) and then back to the primary carrier after three (3) frames into the MSI (indicated at 330). The AMS interprets bit string $b_0 b_1 b_2 b_3 \ldots b_7$ the same way at the beginning of each MSI until a new bit string is transmitted or the AMS discontinues receiving E-MBS service. For example, the AMS switches back to the E-MBS carrier at the start of the next MSI (indicated at 340).

Changing the MSI can result in a change in the length of the bitmap or bit string in order to maintain the same time granularity. For example, to maintain the frame level granularity of 5 ms per bit in the bitmap, the bitmap size will change from eight (8) for an MSI that is two (2) superframe long (as shown in FIG. 3) to sixteen (16) for an MSI that is four (4) superframes long. Given that four (4) frames make a superframe, an MSI that is M superframes long will need a bitmap that is N=4×M bits long.

Changing the time granularity of the bitmap can also result in a change in the length of the bitmap. For example, if the bit map is associated with a superframe level granularity of 20 ms per bit (i.e., each bit is associated with one superframe), then the number of bits in the bitmap is equal to the number of superframes in the MSI. Thus, an MSI that is two (2) superframes long would have a two (2) bit bitmap to indicate the carrier switching times. Likewise, a four (4) superframe long MSI would correspond to a bit map having four (4) bits, eight (8) superframe long MSI—eight (8) bits, sixteen (16) superframe long MSI—sixteen (16) bits, and so on. In other words, an MSI that is M superframes long will need a bitmap that is N=M bits long.

Although FIG. 3 illustrates one embodiment of the use of a string or bitmap to indicate a unicast available interval, various changes may be made to FIG. 3. For example, although a bit value of '1' is used in FIG. 3 to indicate a link to the primary carrier, in other embodiments, a value of '0' or another value could be used to indicate the link to the primary carrier.

Figure 4:
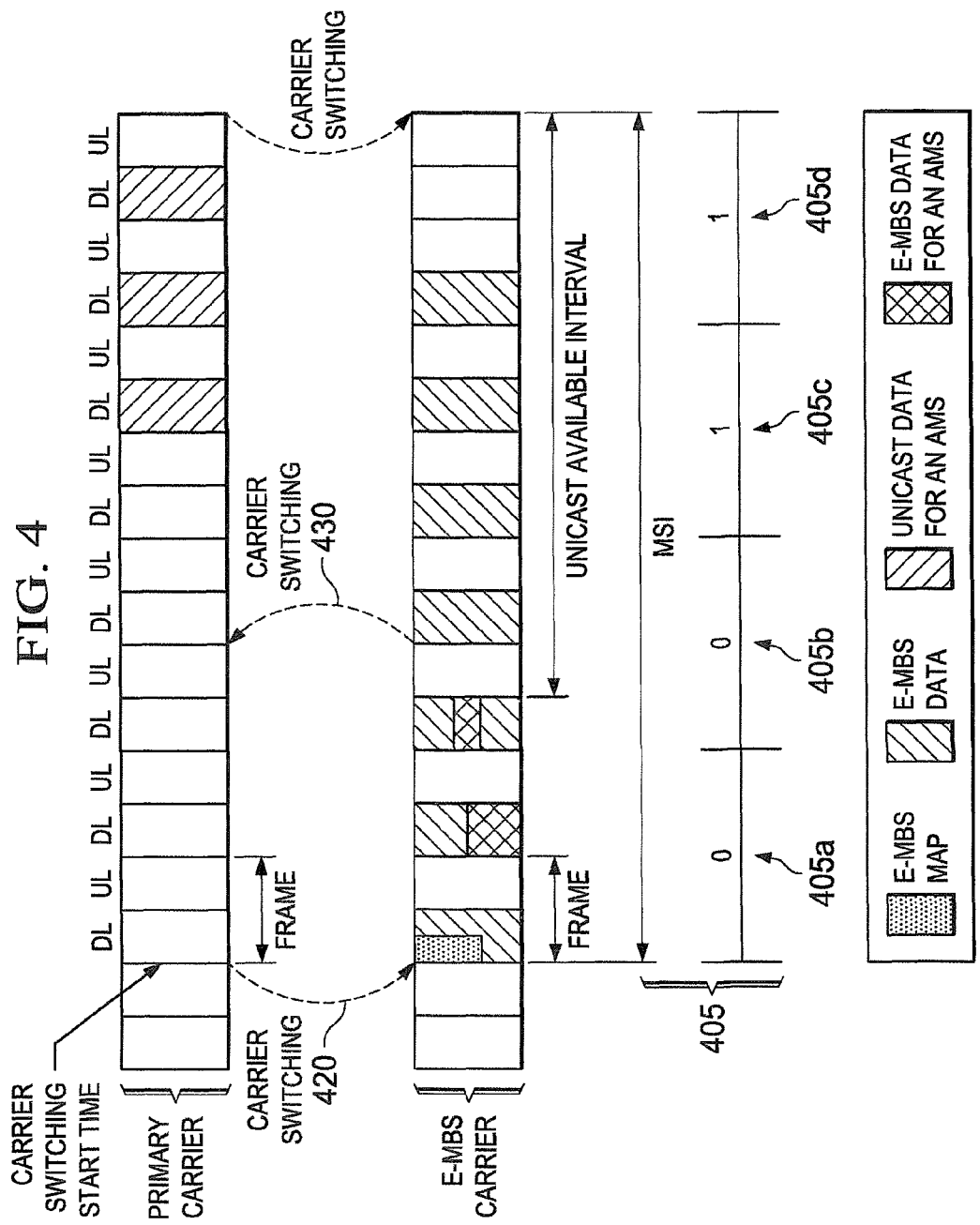
FIG. 4 illustrates a fixed size unicast available interval bitmap, according to an embodiment of this disclosure.

FIG. 4 illustrates a fixed size unicast available interval bitmap, according t: an embodiment of this disclosure. In accordance with this embodiment, an N bit bitmap is used to indicate the unicast available intervals for MSIs of any length. For an MSI of length M, the N bit bitmap is provided by dividing the MSI into intervals where each interval includes ceil(4*M/N) frames, where frame is the chosen granularity of indication. The function ceil(x) rounds number x up to the nearest integer. As described above, the values of the bits in the bitmap are used to indicate when the AMS switches to the primary carrier. The number of frames per N bit bitmap increases as the MSI length increases. Compared to the embodiment shown in FIG. 3, the bitmap size overhead can be reduced by increasing the number of frames per bit of indication.

For example, as shown in FIG. 4, an MSI 405 having a length of two (2) superframes (40 ms length) is divided into N=4 intervals 405a-405d, where each interval has a length of ceil(4*2/4)=2 frames (10 ms). As shown in FIG. 4, the four-bit string $b_0 b_1 b_2 b_3$='0011' indicates that the AMS switches carriers twice during the MSI, once to the E-MBS carrier at the beginning of the MSI (indicated at 420) and again back to the primary carrier after 20 ms into the MSI (indicated at 430). The AMS interprets bitmap $b_0 b_1 b_2 b_3$ the same way at the beginning of each MSI until a new bit map is transmitted or the AMS discontinues receiving E-MBS service.

Changing the MSI while keeping the bitmap size constant at N bits may result in an increase or decrease in the time interval reported per bit. For example, assume that the size of bitmap is fixed at four (4) bits:

For an MSI=two (2) superframes, the interval is two (2) frames per bit;

For an MSI=four (4) superframes, the interval is four (4) frames per bit;

For an MSI=eight (8) superframes, the interval is eight (8) frames per bit;

For an MSI=sixteen (16) superframes, the interval is sixteen (16) frames per bit, Although FIG. 4 illustrates one embodiment of the use of a fixed size unicast available interval bitmap, various changes may be made to FIG. 4. For example, although the bitmap in FIG. 4 has a fixed length of four (4) bits, in other embodiments, the bitmap could have a fixed length of eight (8) bits, sixteen (16) bits, or any other suitable number of bits.

Figure 5:
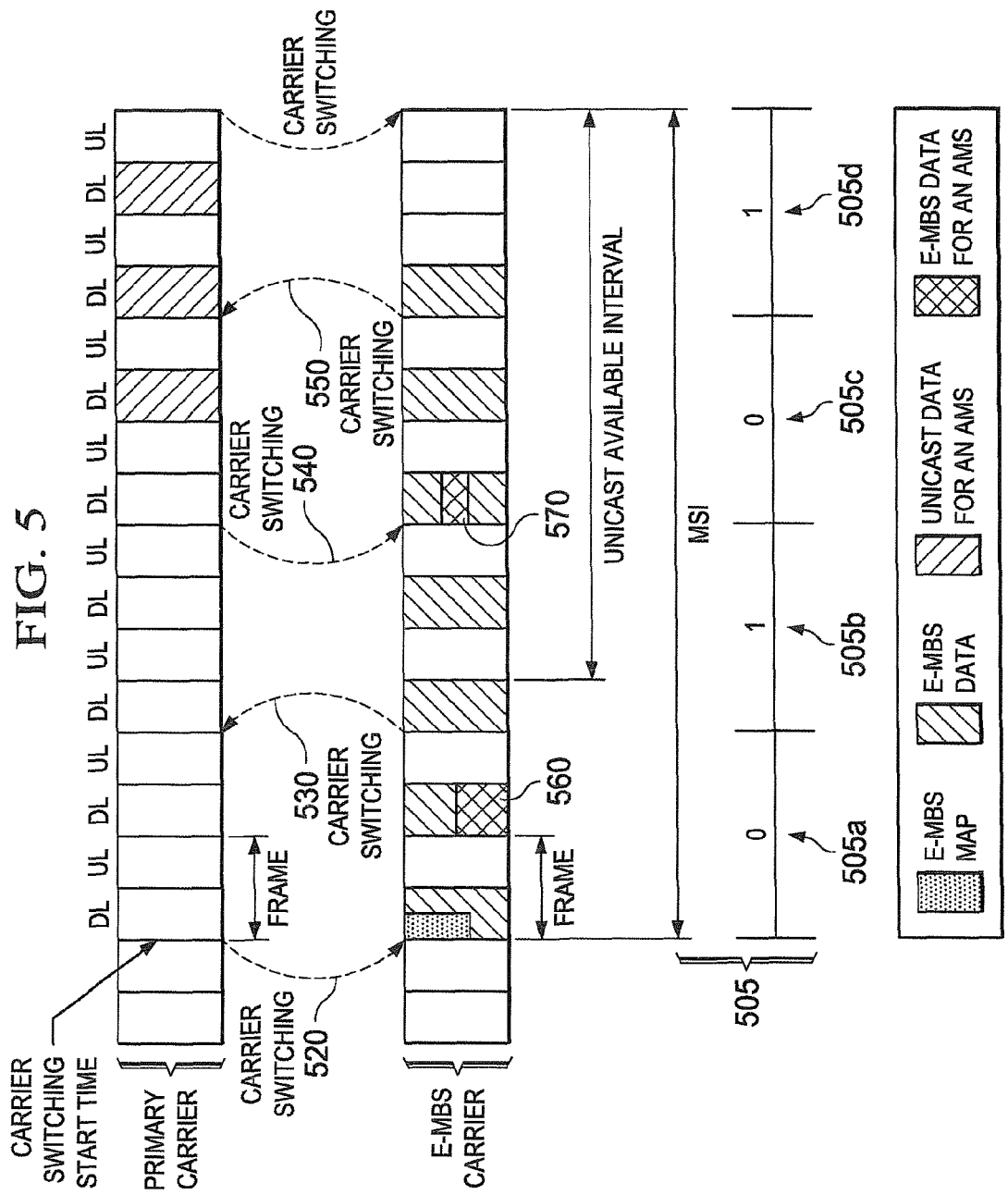
FIG. 5 illustrates use of a bitmap with multiple unicast available intervals, according to an embodiment of this disclosure.

FIG. 5 illustrates use of a bitmap with multiple unicast available intervals, according to an embodiment of this disclosure. Such a bitmap may permit access to E-MBS data that is spread through the MSI without negatively affecting the availability at unicast carriers. As shown in FIG. 5, an MSI 505 having a length of two (2) superframes (40 ms length) is divided into N=4 intervals 505a-505d where each interval has a length of two (2) frames (10 ms). A four (4) bit string $b_0b_1b_2b_3$='0101' is associated with the MSI. The alternating values of the bits in bit string $b_0b_1b_2b_3$ indicate that the AMS switches carriers a total of four times during the MSI. For example, the AMS switches to the E-MBS dedicated carrier at the beginning of the MSI (indicated at 520) to decode the E-MBS MAP and a first E-MBS data stream 560, and switches to the primary carrier at the end of the first interval (indicated at 530). The AMS switches back to the secondary carrier (indicated at 540) to receive a second E-MBS data stream 570, and switches again to the primary carrier at the end of the second interval (indicated at 550).

In accordance with another embodiment of this disclosure, each MSI can have a different, size of bitmap. For a configured MSI m having a length of length M superframes, the bitmap can be of size $N_m$ bits. Such configuration allows flexibility in choosing the granularity of each reporting interval. The unicast available interval indicates when the AMS is available in the primary carrier using $N_m$ bits $b_0b_1b_2 \ldots b_{Nm-1}$. By convention, if $b_i$='0', then the AMS is in secondary carrier and unavailable to the primary carrier. Conversely, if $b_i$='1', then the AMS is available for unicast scheduling in the primary carrier. An example configuration is shown below:

When $M_1$=two (2) superframes long, the length of the bitmap is four (4) bits;

$M_2$=four (4) superframes long, the length of the bitmap is four (4) bits;

$M_3$=eight (8) superframes long, the length of the bitmap is eight (8) bits;

$M_4$=sixteen (16) superframes long, the length of the bitmap is sixteen (16) bits, Thus, depending on the length of the MSI, the number of frames per bit changes. For the example configuration above, when $M_1$=2 superframes long, then the bitmap's granularity is two (2) frames per bit. When M=4, 8 and 16 superframes long, then bitmap granularity is four (4) frames per bit.

Although FIG. 5 illustrates one embodiment of the use of a bitmap with multiple unicast available intervals, various changes may be made to FIG. 5. For example, the length of the MSI and the length of the associated bitmap are configurable by the network operator, and are subject to change by the network operator. In an embodiment, the network operator determines the lengths of the MSI and the bitmap and communicates the values to the AMS. Changes to the bitmap length and/or MSI length may occur at configuration, at the time of a service update, or at any other suitable time.

In accordance with another embodiment of this disclosure, the ABS suggests a unicast available interval to the AMS using a bitmap in the AAI-DSA_REQ message, which is a request for dynamic service addition at the AMS. The bitmap can be configured as described in FIG. 3 or FIG. 4. The change of value from a '0' to '1' or '1' to '0' in the string of bits in the bitmap indicates a carrier switch either to the secondary E-MBS carrier from the primary carrier or vice-versa. The bitmap is carried as a unicast available interval bitmap in an AAI-DSA-REQ message as shown in Table 2 below.

TABLE 2

AAI-DSA_REQ Message with Unicast Available Interval Bitmap

| M/O | Attributes/ Array of attributes | Size (bits) | Value/Notes | Conditions |
|---|---|---|---|---|
| O | Carrier Switching Mode | 1 | 0b0: carrier switching based on Unicast Available Interval<br>0b1: carrier switching based on Available Interval report | In case of ABS-initiated DSA for carrier switching |
| O | Carrier Switching Start Time | 4 | 4 LSBs of superframe number at which carrier switching happens | In case of ABS-initiated DSA for carrier switching |
| O | Unicast Available Interval Bitmap | Variable | Indicates when the AMS should be available in the primary carrier using N bits $b_0b_1b_2 \ldots b_{N-1}$<br>If $b_i$ == 0, then AMS is in secondary carrier and unavailable to the primary carrier<br>If $b_i$ == 1, then AMS is available for unicast scheduling in primary carrier<br>$N_{MSI}$ = 2 superframes: N = 4 bits<br>$N_{MSI}$ = 4 superframes: N = 4 bits<br>$N_{MSI}$ = 8 superframes: N = 8 bits<br>$N_{MSI}$ = 16 superframes: N = 16 bits<br>Depending on the $N_{MSI}$, the number of bits per subframe changes<br>If $N_{MSI}$ = 2, then 2 frames per bit<br>If $N_{MSI}$ = 4, 8 and 16, then 4 frames per bit | In case of ABS-initiated DSA for carrier switching Shall present if Carrier Switching Mode = 0b0 |

In accordance with an embodiment of this disclosure, an AMS uses a predefined MAC Management message called an AAI_E-MBS-REP message to inform an associated ABS of the available interval that includes the duration which the AMS is available to the ABS, and includes an E-MBS Zone ID of the current zone from which the AMS is receiving data when. Carrier Switching Mode=0b1 in the AAI_DSA-REQ/RSP message. In some cases, the ABS may not be able to allocate an explicit unicast: available interval.

Such cases can occur, for example, if the streams for which the DSA transactions are carried out occupy most of the MSI. When the DSA enables streams that are scheduled in the E-MBS carrier for a significant portion of the MSI, then a unicast available interval cannot be clearly identified for the AMS. When a unicast available interval is not identified, the AMS is at a disadvantage by not being able to be scheduled for any unicast data. To overcome such scenarios, the AMS may indicate or report its interval of interest during which the AMS is available in the primary carrier to receive unicast data.

To enable such reporting, the DSA transactions indicate that there is no unicast available interval to be found. This "no unicast available interval" setting allows the AMS to switch to the E-MBS carrier so that it may receive the E-MBS MAP and switch back to the primary carrier. On receiving the E-MBS MAP, the AMS reports to the ABS the discrete interval when the AMS plans to switch to the E-MBS carrier to receive data. To compute the interval, the AMS assumes that the MSI is divided into four equal intervals. Each interval is computed in the unit of frames. Thus changing the MSI will keep the bitmap size constant at N bits, but will increase the time interval reported per bit. For example, for a bitmap size=4 bits:

If MSI=two (2) superframes, the interval is two (2) frames per bit;

If MSI=four (4) superframes, the interval is four (4) frames per bit;

If MSI=eight (8) superframes, the interval is eight (8) frames per bit;

If MSI=sixteen (16) superframes, the interval is sixteen (16) frames per bit.

Using the predefined MAC Management message AAI_E-MBS-REP, the AMS indicates to the ABS which interval the AMS will be available in the primary carrier for unicast scheduling, as shown in Table 3 below.

TABLE 3

AAI_E-MBS-REP message

| M/O | Attributes/Array of attributes | Size (bits) | Value/Notes | Conditions |
|---|---|---|---|---|
| M | MAC Control Message Type | 8 | AAI_E-MBS-REP message | It will be present when Carrier Switching Mode = 0b1 in AAI_DSA-REQ/RSP. |
| M | E-MBS Zone ID | 7 | Indicates E-MBS Zone where the currently receiving E-MBS connections are provided | It will be present when Carrier Switching Mode = 0b1 in AAI_DSA-REQ/RSP. |
| M | Available Interval Bitmap | 4 | Indicates Available Interval where the E-MBS channel selected by AMS is included in the secondary carrier using 4 bits $b_0 b_1 b_2 b_3$<br>If $b_i == 1$, then AMS is in secondary carrier and unavailable to the primary carrier<br>If $b_i == 0$, then AMS is available for unicast scheduling in primary carrier<br>Depending on the $N_{MSI}$, the number of bits per subframe changes<br>If $N_{MSI} = 2$, then 2 frames per bit<br>If $N_{MSI} = 4$, then 4 frames per bit<br>If $N_{MSI} = 8$, then 8 frames per bit<br>If $N_{MSI} = 16$, then 16 frames per bit | It will be present when Carrier Switching Mode = 0b1 in AAI_DSA-REQ/RSP. |

In accordance with an embodiment of this disclosure, a bitmap length field is included in the AAI_E-MBS-REP message to indicate the granularity of the bitmap. The AAI_E-MBS-REP message includes an L-bit bitmap length indicator field, which indicates the length of the bitmap. The bitmap length indicator field allows flexible indication of the bitmap length, thus allowing tailoring of the bitmap size to fit the individual AMS requirements.

The L-bit bitmap length indicator field is used to interpret the length N of the bitmap for a given MSI M. Both the bitmap length indicator field L and the bitmap length N can be a function of the MSI M. The mapping of the bitmap length indicator field L to the bitmap length N can be rule-based or function-based. For example, let the L-bit bitmap length indicator field be three (3) bits long—$l_0 l_1 l_2$. When $l_0 l_1 l_2$='000', the length of the bitmap is N=4×M bits. When $l_0 l_1 l_2$='001', the length of the bitmap is N=2×M bits. Of course, these values are by way of example only. The length of the bitmap could be represented by other values of the L-bit indicator field. Likewise, the L-bit indicator field may have more or fewer than three bits.

Figure 6:
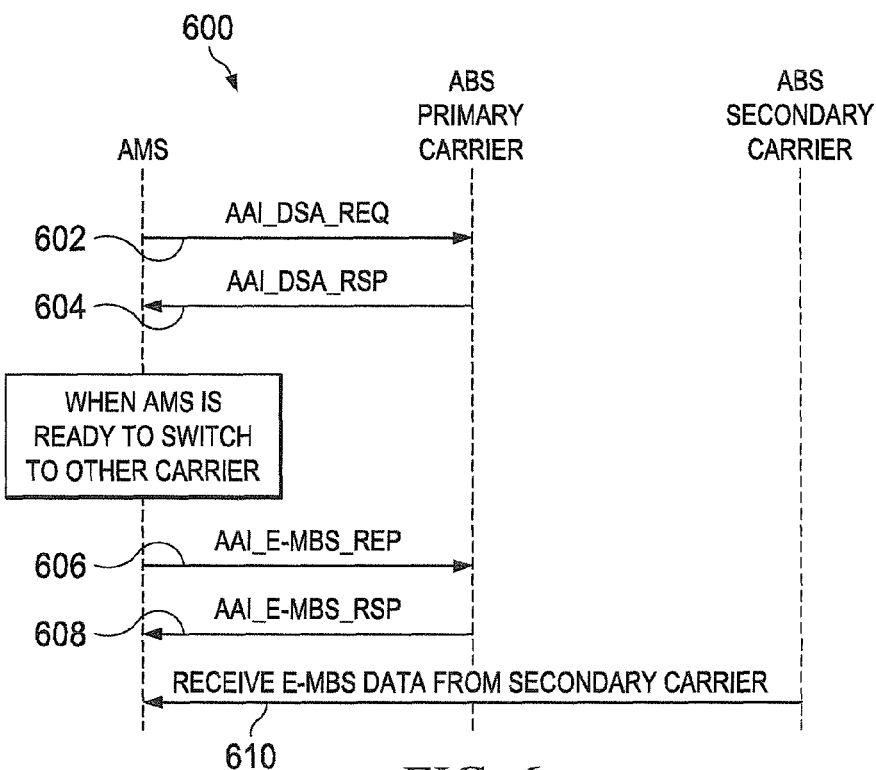
FIG. 6 illustrates a message flow diagram between an AMS and a primary carrier ABS prior to channel switching, according to an embodiment of this disclosure.

FIG. 6 illustrates a message flow diagram between an AMS and a primary carrier ABS prior to channel switching, according to an embodiment of this disclosure. As shown in diagram 600, data is exchanged between the AMS and the primary carrier ABS before the AMS switches to another carrier. The unicast available interval is transmitted from the primary carrier ABS to the AMS, first in the AAI_DSA_RSP message and then later in the AAI_E-MBS_RSP message.

First, the AMS initiates an AAI_DSA_REQ message requesting that a service flow be established for the E-MBS Zone identified by the E-MBS Zone ID and the E-MBS IDs and FIDs (step 602). In response to the AAI_DSA_REQ message from the AMS, the primary carrier ABS transmits to the AMS an AAI_DSA_RSP message containing the E-MBS Zone IDs, E-MBS ID and FIDs for the service flows that are being established (step 604).

The DSA transaction, however, may not imply an immediate carrier switch. In other words, there may be a delay before the switch occurs. When the AMS is ready to switch carriers and receive E-MBS data, then the AMS transmits an AAI_E-MBS_REP message to the primary carrier ABS indicating that the AMS intends to move to the other carrier and receive E-MBS data (step 606). In the AAI_E-MBS_REP message, the AMS includes a report code to indicate to the primary carrier ABS that the primary carrier ABS assign a carrier switching start time by indicating the superframe number at which the AMS can switch. The report code can be a bit string, a flag, or any other suitable indicator that is intended to trigger the requisite action. In return, the primary carrier ABS transmits an AAI_E-MBS_RSP message, which contains the superframe number at which the AMS can switch to the secondary carrier ABS (step 608). The AMS then switches to the secondary carrier to receive E-MBS data (step 610).

As shown in diagram 600, the primary carrier ABS first indicates a unicast available interval bitmap in the AAI_DSA_RSP message in step 604. If the carrier switch occurs at a later time compared to when the AAI_DSA transaction takes place, then the AMS first updates the ABS about: the E-MBS IDs and FIDs that the AMS intends to receive in the AAI_E-MBS_REP message. The ABS acknowledges by transmitting the updated unicast available interval bitmap in addition to the superframe number from which the AMS can begin carrier switching in step 608. The AMS uses the unicast available interval bitmap to compute when it needs to be available in the primary carrier and when it can switch to the secondary carrier.

Those familiar in the art will also note that the ABS can transmit the unicast available bitmap in step 608 even without receiving information about the E-MBS IDs and FIDs that the AMS intends to receive in the AAI_E-MBS_REP message in step 606.

Figure 7:
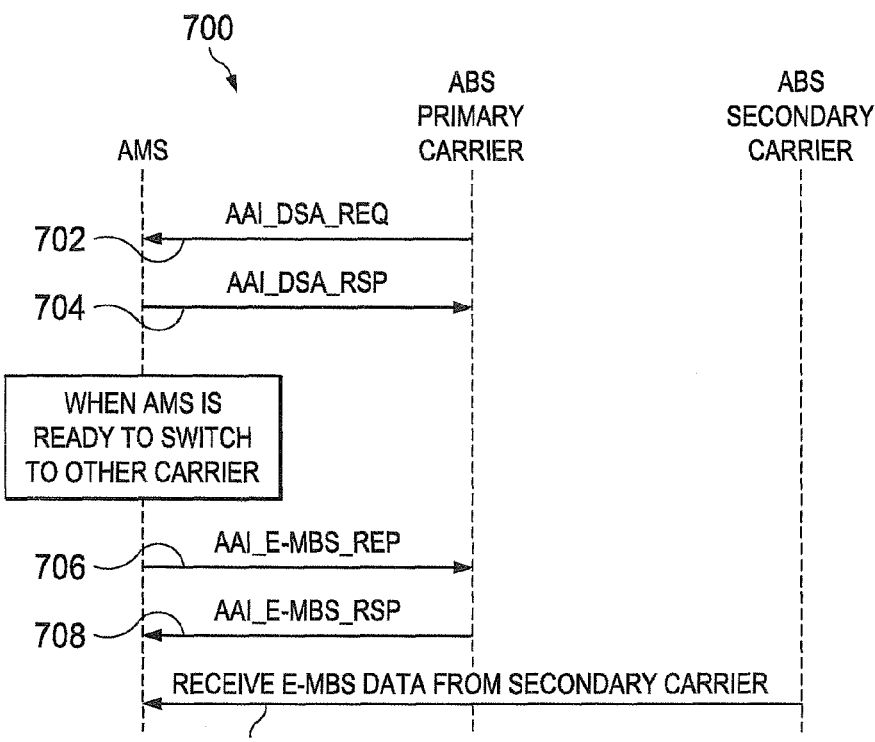
FIG. 7 illustrates a message flow diagram between an AMS and a primary carrier ABS beginning with an ABS-initiated dynamic service addition, according to an embodiment of this disclosure.

FIG. 7 illustrates a message flow diagram between an AMS and a primary carrier ABS beginning with an ABS-initiated DSA, according to an embodiment of this disclosure. As shown in diagram 700, data is exchanged between the AMS and the primary carrier ABS before the AMS can switch to another carrier. The unicast available interval is transmitted from the primary carrier ABS to the AMS, first in the AAI_DSA_REQ message and then later in the AAI_E-MBS_RSP message.

First, the primary carrier ABS initiates an AAI_DSA_REQ message to establish a service flow for the E-MBS Zone identified by the E-MBS Zone ID and the E-MBS IDs and FIDs (step 702). In response to the AAI_DSA_REQ message from the primary carrier ABS, the AMS transmits to the primary carrier ABS an AAI_DSA_RSP message containing the E-MBS Zone IDs, E-MBS ID and FIDs for the service flows that are being established (step 704).

The DSA transaction, however, may not imply an immediate carrier switch. In other words, there may be a delay before the switch occurs. When the AMS is ready to switch carriers and receive E-MBS data, then the AMS transmits an AAI_E-MBS_REP message to the primary carrier ABS indicating that the AMS intends to move to the other carrier and receive E-MBS data (step 706). In the AAI_E-MBS_REP message, the AMS includes a report code to indicate to the primary carrier ABS that the primary carrier ABS assign a carrier switching start time by indicating the superframe number at which the AMS can switch. The report code can be a bit string, a flag, or any other suitable indicator that is intended to trigger the requisite action. In return, the primary carrier ABS transmits an AAI_E-MBS_RSP message, which contains the superframe number at which the AMS can switch to the secondary carrier ABS (step 708). The AMS then switches to the secondary carrier to receive E-MBS data (step 710).

As shown in diagram 700, the primary carrier ABS first indicates a unicast available interval bitmap in the AAI_DSA_REQ message in step 702. If the carrier switch occurs at a later time compared to when AAI_DSA transaction takes place, then the AMS first updates the ABS about the E-MBS IDs and FIDs that the AMS intends to receive in the AAI_E-MBS_REP message. The ABS acknowledges by transmitting the updated unicast available interval bitmap in addition to the superframe number from which the AMS can begin carrier switching in step 708. The AMS uses the unicast available interval bitmap to compute when it needs to be available in the primary carrier and when it can switch to the secondary carrier.

Those familiar in the art will also note that the ABS can transmit the unicast available bitmap in step 708 even without receiving information about the E-MBS IDs and FIDs that the AMS intends to receive in the AAI_E-MBS_REP message in step 706.

In accordance with an embodiment of this disclosure, the unicast available interval bitmap is transmitted by the primary carrier ABS in AAI_E-MBS_RSP (step 608 in FIG. 6) message in response to the AAI_E-MBS_REP message (step 606 in FIG. 6) transmitted by the AMS. The service flows are established and the physical carrier index of the secondary carrier ABS that carries the E-MBS data is indicated in the DSA transaction between the primary carrier ABS and the AMS. When the AMS is ready to switch to the secondary carrier ABS to receive the E-MBS data, the AMS transmits the AAI_E-MBS_REP message to the primary carrier ABS. The AAI_E-MBS_REP message indicates that the AMS is ready to switch to the secondary carrier ABS and requires both the assignment of a carrier switching start time as well as a unicast available interval.

An example format of the AAI_E-MBS_REP message is shown in Table 4 below. In Table 4, a Report Mode field indicates the purpose for the AAI_E-MBS_REP message. For example, when the Report Mode field is set to '0b00', then the AMS requests the primary carrier ABS to assign a carrier switching start time and updates E-MBS connection bitmap.

TABLE 4

AAI_E-MBS_REP message

| M/O | Attributes/ Array of attributes | Size (bits) | Value/Notes | Conditions |
|---|---|---|---|---|
| M | E-MBS Zone ID | 7 | Indicates E-MBS Zone where the currently receiving E-MBS connections are provided | |
| M | Report Mode | 2 | Indicates the AMS starts/ changes/ends of E-MBS<br>0b00: AMS requests ABS to assign a carrier switching start time and updates E-MBS connection Bitmap<br>0b01: AMS updates E-MBS connection Bitmap<br>0b10: AMS ends E-MBS carrier switching<br>0b11: reserved | |
| M | E-MBS Connection Bitmap | 16 | Each bit of the bitmap represents an E-MBS connection for which service flows have been established using AAI-DSx transactions in one E-MBS Zone. The E-MBS service(s) are mapped in ascending order of their E-MBS ID + FID value from LSB to MSB of the bitmap.<br>For each bit:<br>Value 0: The AMS does not intend to receive the E-MBS service.<br>Value 1: The AMS currently receives E-MBS or the AMS may switch to this service in the near future. | Shall be included if the value of Report Mode is 0b00. |

In response to the AAI_E-MBS_REP message, the primary carrier ABS transmits the AAI_E-MBS_RSP message, which carries the unicast available interval in addition to the superframe number from which the AMS can begin carrier switching. An example format of the AAI_E-MBS_RSP message that carries the unicast available interval to the AMS is shown in Table 5 below.

TABLE 5

AAI_E-MBS_RSP message

| M/O | Attributes/ Array of attributes | Size (bits) | Value/Notes | Conditions |
|---|---|---|---|---|
| M | Carrier Switching Start time | 4 | 4 LSBs of superframe number at which the AMS starts carrier switching operation when the report mode is 0b00;<br>4 LSBs of superframe number at which the AMS stops carrier switching operation when the report mode is 0b01. | |
| M | Available Interval Bitmap | 4 | Indicates Available Interval where the E-MBS channel selected by AMS is included in the secondary carrier using 4 bits $b_0 b_1 b_2 b_3$<br>If $b_i == 1$, then AMS is in secondary carrier and unavailable to the primary carrier<br>If $b_i == 0$, then AMS is available for unicast scheduling in primary carrier<br>Depending on the $N_{MSI}$, the number of bits per subframe changes<br>If $N_{MSI} = 4$, then 4 frames per bit<br>If $N_{MSI} = 8$, then 8 frames per bit<br>If $N_{MSI} = 16$, then 16 frames per | Included when the report mode in AAI_E-MBS_REP message is either 0b00 and 0b01 |

TABLE 5-continued

AAI_E-MBS_RSP message

| M/O | Attributes/ Array of attributes | Size (bits) | Value/Notes | Conditions |
|---|---|---|---|---|
| | | bit | If $N_{MSI}$ = 32, then 32 frames per bit | |

Figure 8:
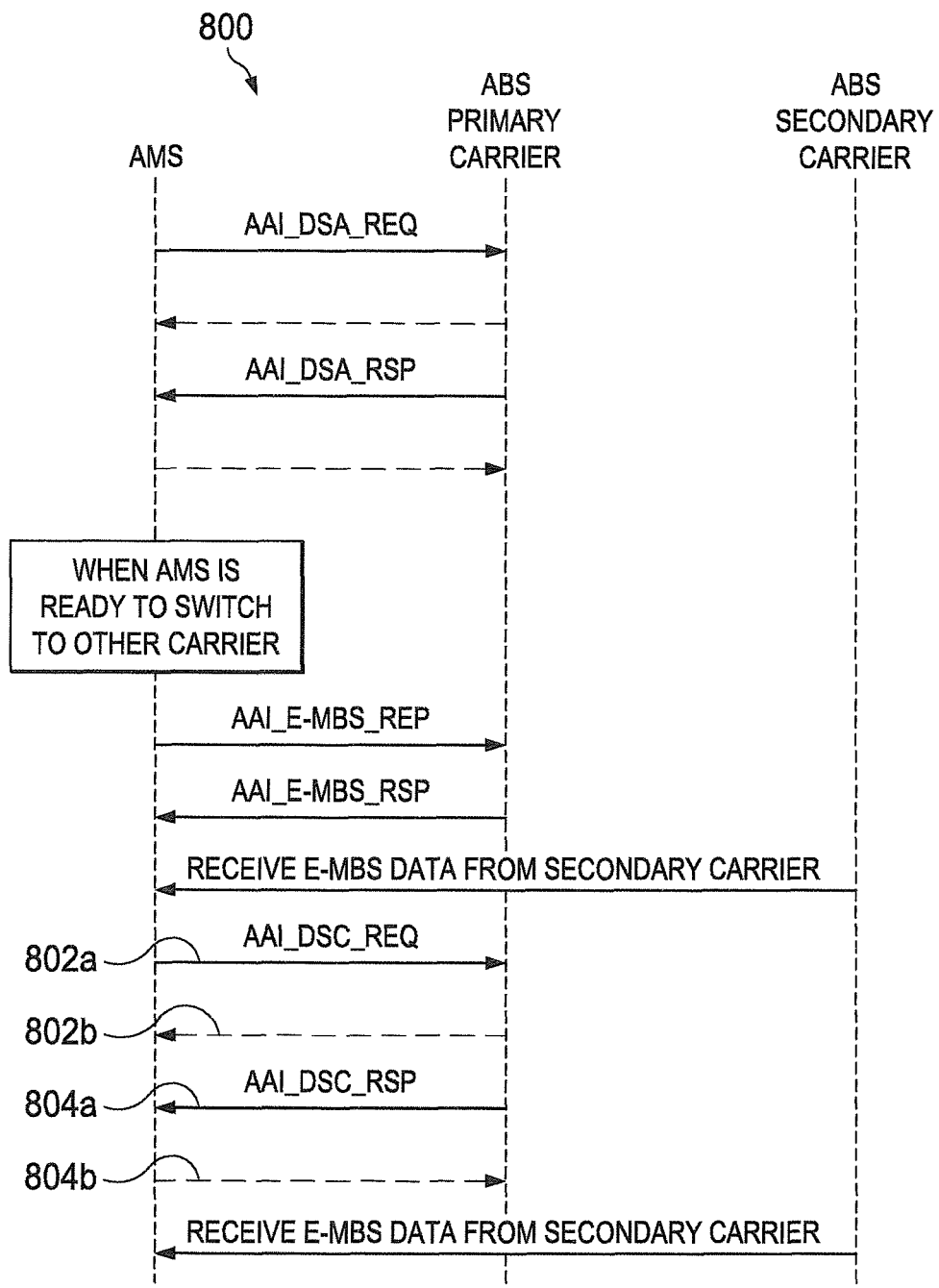
FIG. 8 illustrates a message flow diagram between an AMS and a primary carrier ABS associated with a dynamic service addition or change, according to an embodiment of this disclosure.

FIG. 8 illustrates a message flow diagram between an AMS and a primary carrier ABS associated with a dynamic service addition or change, according to an embodiment of this disclosure. Some of the steps shown in FIG. 8 are the same as, or similar to, those shown in FIGS. 6 and 7. Therefore, a detailed description of these steps is omitted.

A change in established service flows can trigger an AAI_DSC transaction, which is used to update the unicast available interval. As shown in FIG. 8, an AAI_DSC_REQ message can be transmitted by either the AMS (step 802a) or the primary carrier ABS (step 802b). In case of E-MBS, new E-MBS ID or service connection updates are initiated by the ABS in the AAI_DSC_REQ message. In addition to updating the service flows, the ABS can update the unicast available interval and indicate the interval in the AAI_DSC_REQ message. The AMS acknowledges the changes in the service flow by transmitting an AAI_DSC_RSP message to the primary carrier ABS (step 804b). Alternatively, the AAI_DSC_RSP message may be transmitted by the primary carrier ABS (step 804a).

This update of the unicast available interval through AAI_DSC_REQ message may not trigger an AAI_E-MBS_REP/RSP transaction. If the ABS is unable to accommodate a new unicast available interval in the AAI_DSC_REQ message, the ABS could request the AMS to initiate an AAI_E-MBS_REP/RSP message to update the unicast available interval. This request could be a flag or a bit that triggers the AAI_E-MBS_REP/RSP transaction. Those familiar in the art will note that not all service updates will require an AAI_E-MBS_REP/RSP transaction or a change in the unicast available interval.

Figure 9:
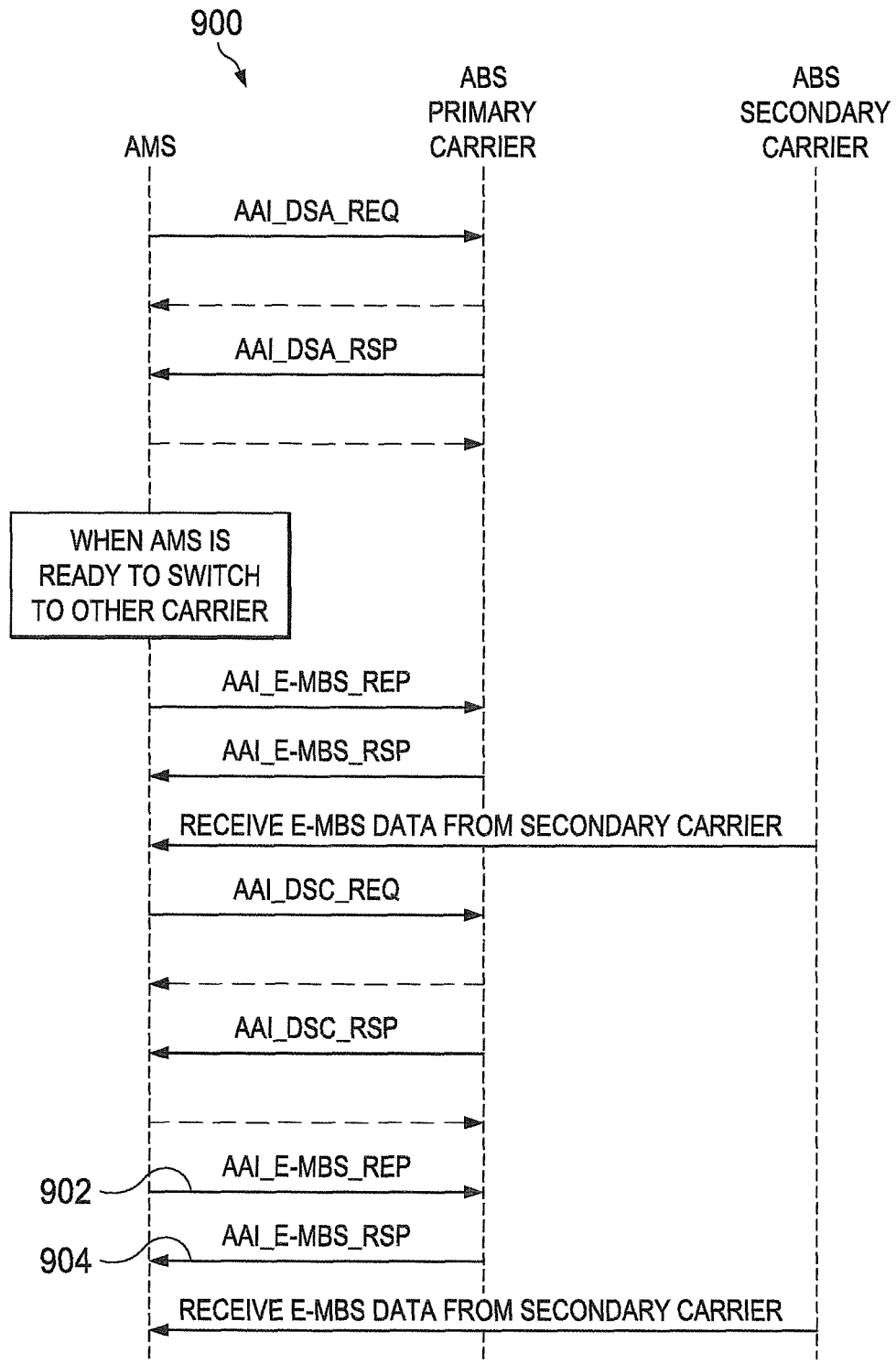
FIG. 9 illustrates a message flow diagram between an AMS and a primary carrier ABS in association with updating a unicast available interval (UAI), according to an embodiment of this disclosure.

FIG. 9 illustrates a message flow diagram between an AMS and a primary carrier ABS in association with updating a unicast available interval (UAI), according to an embodiment of this disclosure. Some of the steps shown in FIG. 9 are the same as, or similar to, those shown in FIGS. 6 through 8. Therefore, a detailed description of these steps is omitted.

As shown in FIG. 9, any change in the UAI triggered due to a change in service flows can be transacted using the AAI_E-MBS REP/RSP messages (steps 902, 904). If the service flows are updated using the AAI_DSC_REQ/RSP transaction, then the update triggers an AAI_E-MBS_REP/RSP transaction initiated by the AMS to update the unicast available interval. However, not all changes in service flow trigger an update in unicast available interval. For example, the AAI_E-MBS_REP/RSP message exchange may be triggered only if the unicast available interval requires updating, which can be indicated by a flag in the DSC_REQ message.

Figure 10:
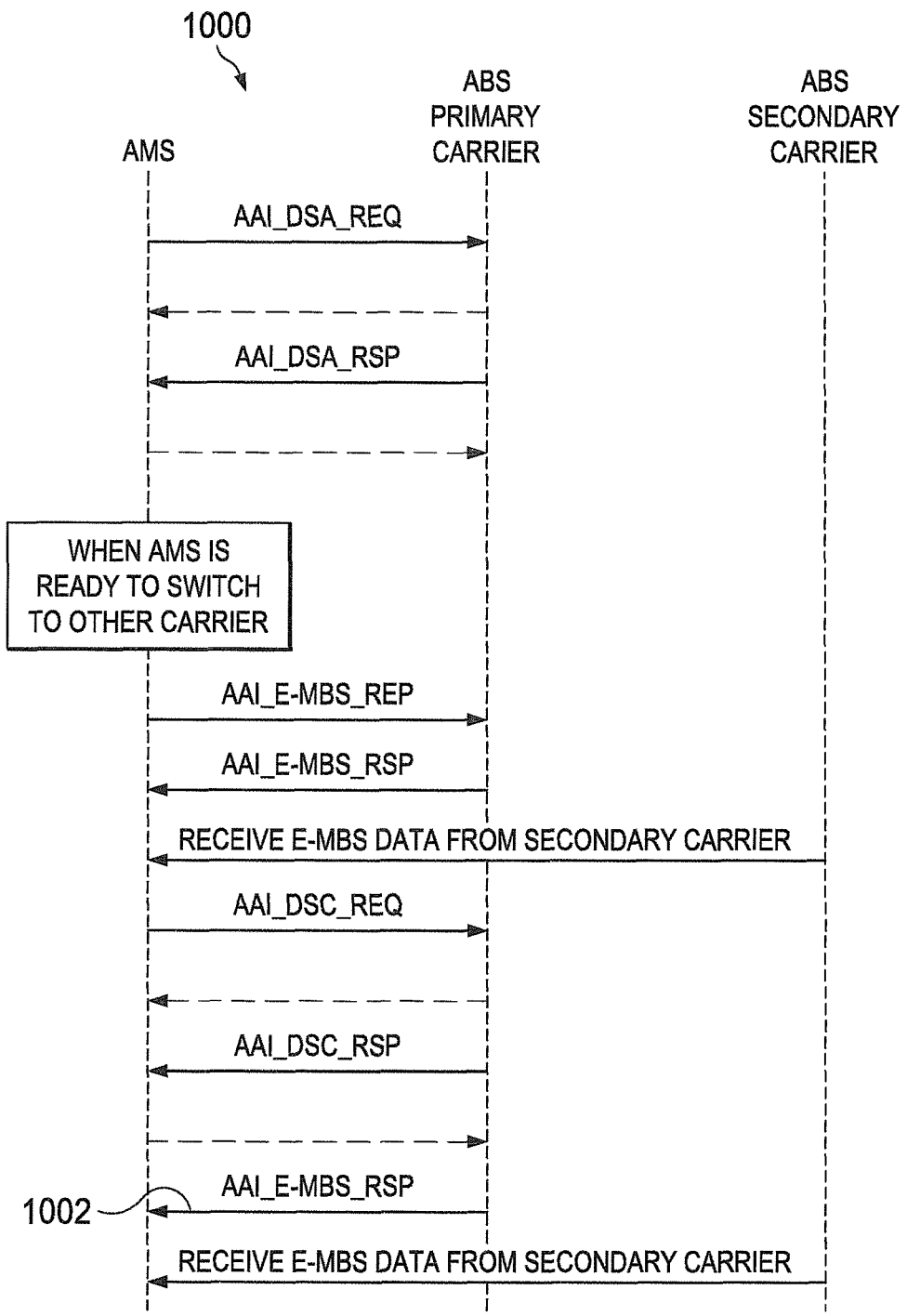
FIG. 10 illustrates a message flow diagram between an AMS and a primary carrier ABS to enable carrier switching triggered by a dynamic service change (DSC) exchange, according to an embodiment of this disclosure.

FIG. 10 illustrates a message flow diagram between an AMS and a primary carrier ABS to enable carrier switching triggered by a DSC exchange, according to an embodiment of this disclosure. Some of the steps shown in FIG. 10 are the same as, or similar to, those shown in FIGS. 6 through 9. Therefore, a detailed description of these steps is omitted.

As shown in FIG. 10, any change in the UAI triggered due to a change in service flows can be transacted using the AAI_E-MBS_RSP messages transmitted by the primary carrier ABS to the AMS (step 1002). This transmission is a standalone transmission of an AAI_E-MBS_RSP message and is not in response to the AAI_E-MBS_REP message transmitted by the AMS.

If the service flows are updated using the AAI_DSC_REQ/RSP transaction, then the update would trigger an AAI_E-MBS_RSP transaction initiated by the AMS to update the unicast available interval. This procedure is illustrated in FIG. 10 where the ABS transmits an AAI_E-MBS_RSP message following an AAI_DSC transaction to update the unicast available interval. However, not all changes in service flow trigger an update in unicast available interval. For example, the AAI_E-MBS_RSP message may be transmitted only if the unicast available interval requires updating. Otherwise, the AMS assumes that the unicast available interval prior to the AAI_DSC transaction is still operative and uses that for carrier switching.

Although FIGS. 6 through 10 illustrate embodiments of a message flow between an AMS and a primary carrier ABS, various changes may be made to FIGS. 6 through 10. For example, while shown as a series of steps, various steps in FIGS. 6 through 10 may overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a subscriber station in a wireless communication network, a method of switching carriers, the method comprising:
   receiving an Advanced Air Interface-Dynamic Service Addition-Request (AAI-DSA_REQ) message from the communication network, the AAI-DSA_REQ message comprising a N-bit bitmap, wherein each bit of the N-bit bitmap corresponds to a time interval in a Multicast Broadcast Service scheduling interval (MSI), wherein N is an integer;
   determining at least one unicast available interval based on an arrangement of the N bits of the N-bit bitmap in the AAI-DSA_REQ message; and
   switching from a first carrier to a second carrier at a start of the at least one unicast available interval.

2. The method of claim 1, wherein:
   each bit in the N-bit bitmap has a first value or a second value,
   the start of each of the at least one unicast available interval corresponds to a first bit having the first value and a second bit adjacent to the first bit having the second value, and an end of each of the at least one unicast available interval corresponds to a third bit having the second value and a fourth bit adjacent to the third bit having the first value.

3. The method of claim 2, further comprising:
switching from the second carrier to the first carrier at the end of the at least one unicast available interval.

4. The method of claim 1, wherein the length N of the N-bit bitmap is determined based on a length of the MSI.

5. The method of claim 1, wherein the N-bit bitmap is received from the communication network in an AAI-E-MB-S_RSP (Advanced Air Interface-Enhanced Multicast Broadcast Service-Response) message when the subscriber station is not ready to switch to a different carrier at the time of a AAI_DSA (Advanced Air Interface-Dynamic Service Addition) transaction.

6. The method of claim 1, further comprising:
transmitting an N-bit bitmap to the communication network in an AAI-E-MBS_REP (Advanced Air Interface-Enhanced Multicast Broadcast Service-Report) message when the communication network is unable to allocate an explicit unicast available interval.

7. For use in a wireless communication network, a subscriber station capable of switching carriers, the subscriber station comprising:
at least one antenna; and
processing circuitry communicatively coupled to the at least one antenna, the processing circuitry configured to:
receive an Advanced Air Interface-Dynamic Service Addition-Request (AAI-DSA_REQ) message from the communication network, the AAI-DSA_REQ message comprising a N-bit bitmap, wherein each bit of the N-bit bitmap corresponds to a time interval in a Multicast Broadcast Service scheduling interval (MSI), wherein N is an integer;
determine at least one unicast available interval based on an arrangement of the N bits of the N-bit bitmap in the AAI-DSA_REQ message; and
switch from a first carrier to a second carrier at a start of the at least one unicast available interval.

8. The subscriber station of claim 7, wherein:
each bit in the N-bit bitmap has a first value or a second value,
the start of each of the at least one unicast available interval corresponds to a first bit having the first value and a second bit adjacent to the first bit having the second value, and
an end of each of the at least one unicast available interval corresponds to a third bit having the second value and a fourth bit adjacent to the third bit having the first value.

9. The subscriber station of claim 8, the processing circuitry further configured to:
switch from the second carrier to the first carrier at the end of the at least one unicast available interval.

10. The subscriber station of claim 7, wherein the length N of the N-bit bitmap is determined based on a length of the MSI.

11. The subscriber station of claim 7, wherein the N-bit bitmap is received from the communication network in an Advanced Air Interface-Enhanced Multicast Broadcast Service-Response (AAI-E-MBS_RSP) message when the subscriber station is not ready to switch to a different carrier at the time of an Advanced Air Interface-Dynamic Service Addition (AAI_DSA) transaction.

12. The subscriber station of claim 7, the processing circuitry further configured to:
transmit an N-bit bitmap to the communication network in an Advanced Air Interface-Enhanced Multicast Broadcast Service-Report (AAI-E-MBS_REP) message when the communication network is unable to allocate an explicit unicast available interval.

13. For use in a wireless communication network having a plurality of base stations, a method of switching carriers for communication with a subscriber station, the method comprising:
transmitting an Advanced Air Interface-Dynamic Service Addition-Request (AAI-DSA_REQ) message from a first base station to a subscriber station, the AAI-DSA_REQ message comprising a N-bit bitmap, wherein each bit of the N-bit bitmap corresponds to a time interval in a Multicast Broadcast Service scheduling interval (MSI), wherein N is an integer;
determining at least one unicast available interval based on an arrangement of the N bits of the N-bit bitmap in the AAI-DSA_REQ message; and
at a start of the at least one unicast available interval, transferring communication with the subscriber station from the first base station to a second base station, the first base station associated with a first carrier and the second base station associated with a second carrier.

14. The method of claim 13, wherein:
each bit in the N-bit bitmap has a first value or a second value,
the start of each of the at least one unicast available interval corresponds to a first bit having the first value and a second bit adjacent to the first bit having the second value, and
an end of each of the at least one unicast available interval corresponds to a third bit having the second value and a fourth bit adjacent to the third bit having the first value.

15. The method of claim 14, further comprising:
at the end of the at least one unicast available interval, transferring communication with the subscriber station back from the second base station to the first base station.

16. The method of claim 13, wherein the length N of the N-bit bitmap is determined based on a length of the MSI.

17. The method of claim 13, wherein the N-bit bitmap is transmitted from the first base station in an Advanced Air Interface-Enhanced Multicast Broadcast Service-Response (AAI-E-MBS_RSP) message when the subscriber station is not ready to switch to a different carrier at the time of an Advanced Air Interface-Dynamic Service Addition (AAI_DSA) transaction.

18. The method of claim 13, further comprising:
receiving an N-bit bitmap from the subscriber station in an Advanced Air Interface-Enhanced Multicast Broadcast Service-Report (AAI-E-MBS_REP) message when the first base station is unable to allocate an explicit unicast available interval.

19. A wireless communication network having a plurality of base stations capable of communicating with a subscriber station, the communication network comprising:
a first base station configured to:
transmit an AAI-DSA_REQ (Advanced Air Interface-Dynamic Service Addition-Request) message to a subscriber station, the AAI-DSA_REQ message comprising a N-bit bitmap, wherein each bit of the N-bit bitmap corresponds to a time interval in a Multicast Broadcast Service scheduling interval (MSI), wherein N is an integer;
determine at least one unicast available interval based on an arrangement of the N bits of the N-bit bitmap in the AAI-DSA_REQ message; and at a start of the at least one unicast available interval, transfer communication with the subscriber station to a second base station,
wherein the first base station is associated with a first carrier and the second base station is associated with a second carrier.

20. The communication network of claim 19, wherein:
each bit in the N-bit bitmap has a first value or a second value,
the start of each of the at least one unicast available interval corresponds to a first bit having the first value and a second bit adjacent to the first bit having the second value, and
an end of each of the at least one unicast available interval corresponds to a third bit having the second value and a fourth bit adjacent to the third bit having the first value.

21. The communication network of claim 20, the second base station configured, at the end of the at least one unicast available interval, to transfer communication with the subscriber station back to the first base station.

22. The communication network of claim 19, wherein the length N of the N-bit bitmap is determined based on a length of the MSI.

23. The communication network of claim 19, wherein the N-bit bitmap is transmitted from the first base station in an Advanced Air Interface-Enhanced Multicast Broadcast Service-Response (AAI-E-MBS_RSP) message when the subscriber station is not ready to switch to a different carrier at the time of an Advanced Air Interface-Dynamic Service Addition (AAI_DSA) transaction.

24. The communication network of claim 19, the first base station further configured to:
receive an N-bit bitmap from the subscriber station in an Advanced Air Interface-Enhanced Multicast Broadcast Service-Report (AAI-E-MBS_REP) message when the first base station is unable to allocate an explicit unicast available interval.

* * * * *